United States Patent [19]

Marcy

[11] 4,390,951

[45] Jun. 28, 1983

[54] APPARATUS FOR MONITORING ROAD TRAFFIC TO CONTROL AN ASSOCIATED SIGNALING SYSTEM

[75] Inventor: Raymond Marcy, Paris, France

[73] Assignee: Thomson-CSF, Paris, France

[21] Appl. No.: 183,927

[22] Filed: Sep. 3, 1980

[30] Foreign Application Priority Data

Sep. 7, 1979 [FR] France ............................... 79 22452

[51] Int. Cl.³ ........................ G06F 15/48; G08G 1/00

[52] U.S. Cl. .................................... 364/436; 364/437; 364/438; 340/31 A; 340/38 R; 340/37; 340/41 R

[58] Field of Search ........................ 364/436, 437, 438; 340/31 A, 38 R, 37, 41; 235/92 TC

[56] References Cited

U.S. PATENT DOCUMENTS

| | | | |
|---|---|---|---|
| 3,406,395 | 10/1968 | Zupanick | 364/437 |
| 3,445,637 | 5/1969 | Auer | 364/437 |
| 3,920,967 | 11/1975 | Martin | 364/437 |
| 4,023,017 | 5/1977 | Ceseri | 364/438 |
| 4,167,785 | 9/1979 | McReynolds | 364/437 |

*Primary Examiner*—Charles E. Atkinson
*Assistant Examiner*—Michael R. Fleming
*Attorney, Agent, or Firm*—Karl F. Ross; Herbert Dubno

[57] ABSTRACT

An apparatus designed to monitor traffic on a section of road of given length L for modifying the operation of a traffic light at an intersection approached by that road comprises speed-sensing circuits at opposite ends of the surveyed road section, the entrance-side circuit also emitting pulse trains reflecting the lengths Li of passing vehicles. A calculator determines from the measured entrance and exit speeds a mean overall speed VM which is inversely proportional to the mean transit time L/VM and enables the computation of an occupancy density DE(t)=ΣLi/L from which in turn an encumbrance P(t)=DE(t)/VM is derived. The traffic light can be controlled directly by a signal which is proportional to this encumbrance P(t), or which represents a related function F(t). An additional modification of the operating cycle of such traffic light can be brought about by a signal indicating the approach of a vehicle of unusual length on the surveyed road section.

10 Claims, 2 Drawing Figures

APPARATUS FOR MONITORING ROAD TRAFFIC TO CONTROL AN ASSOCIATED SIGNALING SYSTEM

FIELD OF THE INVENTION

My present invention relates to an apparatus for monitoring road traffic in order to control an associated signaling system usually comprising one or more traffic lights.

BACKGROUND OF THE INVENTION

In certain parts of the road network, and particularly in cities, a signaling system is necessary for regulating the traffic flow. For this purpose, for example, traffic lights can be controlled to give priority to traffic flow on one road section rather than on another, especially at intersections between minor roads and major highways or between roads having widely differing traffic patterns.

Normally, traffic-regulating systems have fixed repetition cycles. The resulting predetermined passage time for vehicles coming from a given road section can lead to congestion at the crossroads in question. Thus, traffic-flow conditions evolve differently over a 24-hour period on road sections leading to one and the same crossroads. It is therefore necessary to take account of these traffic variations on intersecting roads. Moreover, the increasing number of long and heavy vehicles of the bus and truck-and-trailer types make it necessary to modify the operating cycle of the traffic lights in such a way that when such a vehicle arrives at the intersection it can easily pass across it.

Devices known in the prior art make it possible to define certain characteristic parameters of the traffic flow on a given road section. In view of their measuring simplicity, the most frequently used means of this sort respond to the flow rate of vehicles per unit of time, the average speed of the vehicles passing a certain location at a given time, the concentration of the vehicles on a given road section and the extent of occupancy of vehicles traversing this section. The direct control of traffic lights, for example at a road intersection, as a function of the values obtained from measuring the aforementioned parameters leads to numerous disadvantages. Measurements have been taken in urban networks on road sections having widely differing traffic patterns. With comparisons based on measurements of speed, flow rate and concentration or occupancy level, for example, the mean value of the variations obtained for the traffic-signal control at the road sections involved was low. This shows that ambiguities exist, which can be of a highly prejudicial nature, if consideration is given to only one of the aforementioned parameters.

OBJECT OF THE INVENTION

The object of my present invention is to obviate these disadvantages by defining a new parameter, referred to hereinafter as encumbrance P(t), to be used for the control of traffic signals.

SUMMARY OF THE INVENTION

A traffic-monitoring apparatus embodying my present invention comprises speed-sensing means disposed at a road section to be surveyed, arithmetic means connected to the speed-sensing means for determining a mean overall speed VM of vehicles passing over the surveyed road section, pulse-generating means disposed at an entrance end of that road section for emitting trains of measuring pulses representing by their number the lengths Li of vehicles entering same, processing means connected to the arithmetic means and to the pulse-generating means for obtaining from the pulse trains and from the means speed VM a count of measuring pulses representing the combined length $\Sigma Li$ of vehicles simultaneously present on the surveyed road section and for deriving from that count an occupancy density $DE(t)=\Sigma Li/L$, and computer means connected to the processing means and to the arithmetic means for generating an output signal proportional to an encumbrance $P(t)=DE(t)/VM$ which is indicative of the degree of loading of the road section by vehicular traffic and which can be used, directly or through the intermediary of a function generator emitting a related signal, for modifying the operation of traffic-regulation means (such as a traffic light) at a location approached by the vehicles.

Pursuant to a more particular feature of my invention, the speed-sensing means may comprise first and second measuring circuits respectively disposed at the entrance end and at an exit end of the surveyed road section, these circuits feeding respective speed signals to a first and a second averaging circuit forming part of the aforementioned arithmetic means; a third averaging circuit, with inputs connected to the first and second averaging circuits, emits a signal representative of the mean speed VM.

BRIEF DESCRIPTION OF THE DRAWING

The above and other features of my invention will now be described in greater detail with reference to the attached drawing wherein.

DETAILED DESCRIPTION

As stated above, the apparatus according to my invention utilizes a variable parameter, termed encumbrance P(t), which is a function of time t and is defined by:

$$P(t)=DE(t)/VM \quad (1)$$

where DE(t) corresponds to the measurement of the occupancy density of a given road section of length L as a function of time t and VM is the average speed of the vehicles traveling along that road section.

The apparatus according to my invention therefore has at least two calculating circuits, the first determining the occupancy density DE(t) and the average speed VM of the vehicles traveling along this road section and the second computing the encumbrance P(t) as a function of these two variable parameters.

Figure 1:
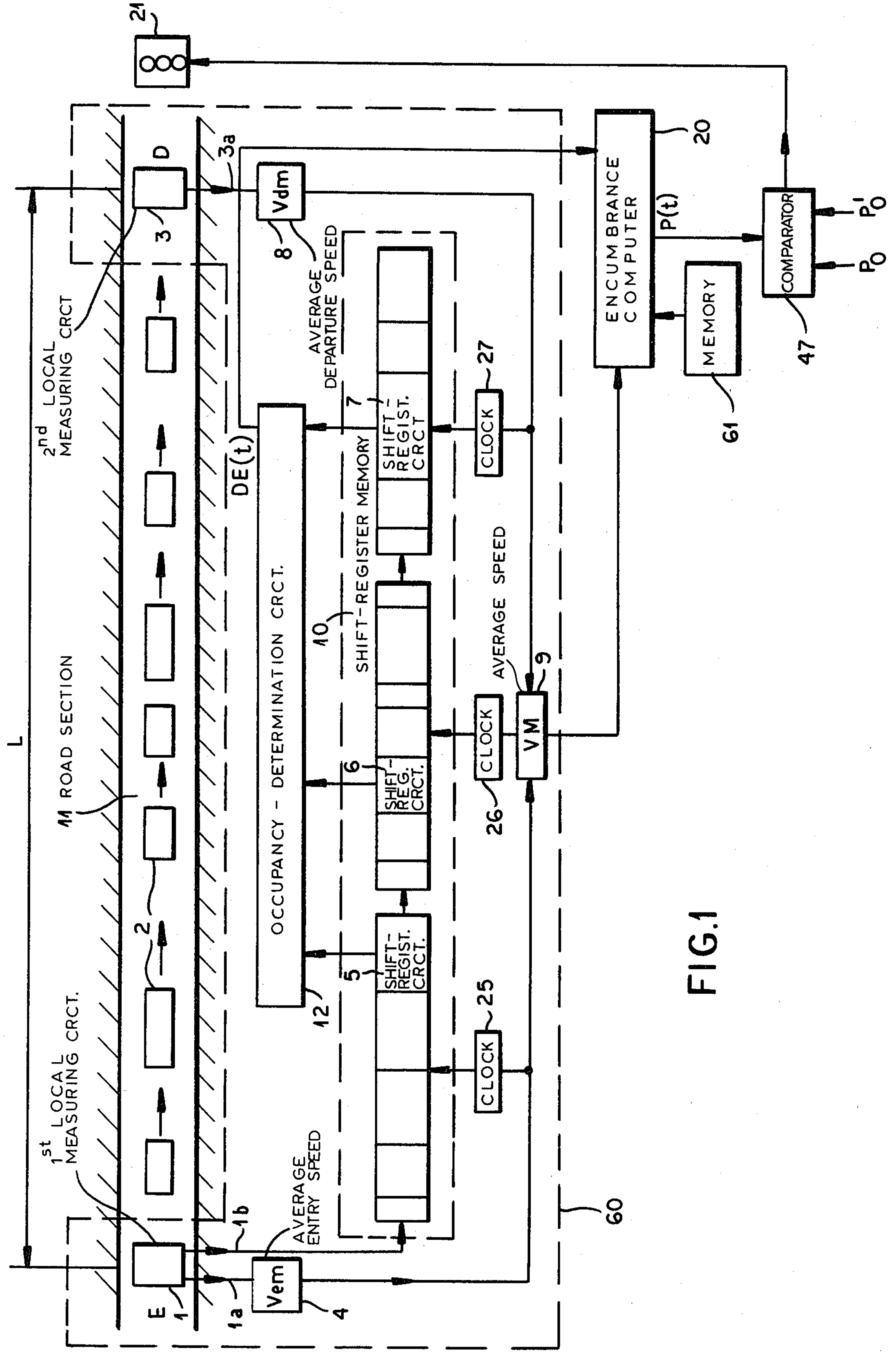
FIG. 1 diagrammatically illustrates a simple embodiment of the present invention.

FIG. 1 shows an embodiment of the apparatus according to my invention for a single-lane road section 11 having a length L between an entrance end E and an exit or departure end D. The apparatus comprises a circuit arrangement 60 including a first local measuring circuit 1 at end E, serving to determine the speed and length of vehicles 2 entering the selected road section 11, and a second local measuring circuit 3 located at end D which determines only the speed of the vehicles leaving the road section. These two local measuring circuits 1 and 3, containing conventional speed sensors, are respectively connected by leads 1*a* and 3*a* to two circuits 4 and 8 which determine the average entry speed Vem and the average departure speed Vdm of vehicles 2 on road section 11. Arithmetic units 4 and 8 are connected on the one hand to a processing memory unit 10, comprising three storage circuits 5, 6, 7 of the shift-register type, and on the other hand to another arithmetic unit 9 determining the average overall speed VM of vehicles 2 on the surveyed road section 11. The memory unit 10 is connected to a circuit 12 for determining the occupancy density De(t). The outputs of circuits 12 and 9 are connected to respective inputs of a computer stage 20 for calculating the encumbrance P(t), circuit 20 being connected to an output terminal 21 by way of a comparator 47 and having another input connected to a memory 61.

The entrance-end measuring circuit 1 detects the passage of each of the vehicles 2 entering the road section 11. For each entering vehicle this circuit transmits on the lead 1*a* a signal representing the speed Vei of such vehicle at the measuring point and on another lead 1*b* an indication of the length Li of the vehicle in the form of an uninterrupted succession of binary pulses whose number is directly proportional to the length of the vehicle in question. This succession of unity-amplitude measuring pulses is introduced into the first storage circuit 5 of memory unit 10 which is stepped by a clock circuit 25 whose frequency is directly proportional to the average speed Vem of the vehicles entering the road section 11 as determined by circuit 4. The value of the average departure speed Vdm of the same vehicles, leaving the road section 11, is determined by circuit 8 and transmitted to circuit 9 for determining the average overall speed VM of the vehicles traveling over road section 11. This value VM is the mean of the entrance and departure speeds, i.e. VM=(Vem+Vdm)/2. The second storage circuit 6, receiving from circuit 5 the binary pulse train representing the lengths of vehicles entering the road section 11, is stepped by a clock 26 whose frequency is directly proportional to the mean vehicular speed VM and thus inversely proportional to the mean transit time. In the same way the third storage circuit 7, connected to the output of the second storage circuit 6, is stepped by a clock 27 whose frequency is directly proportional to the average speed at which the vehicles leave the road section 11 at its end D.

The occupancy-determining circuit 12 continuously divides the sum of the lengths Li of the vehicles on road section 11 by the length L thereof. For this purpose, circuit 12 continuously receives the contents of the several shift registers of memory unit 10 in the form of parallel output pulses. The combined length of the vehicles occupying this road section is then determined by simply counting the measuring pulses contained in circuits 5–7 of memory unit 10 and available at their outputs at any time. To this end the occupancy-determination circuit 12 can incorporate a microprocessor-type calculator establishing the ratio between the sum of the lengths Li of the vehicles and the length L of the road section 11. The storage capacity of circuits 5, 6, 7 depends on the number of unity pulses envisaged for representing a given length. It is obvious that the accuracy of the measurement of the lengths of vehicles entering the road section 11 is directly dependent on the length of a pulse cycle of the local measuring circuit 1 and consequently on the sampling frequency of that circuit. Any increase in the accuracy of the vehicular-length measurement and therefore of the determination of the occupancy density DE(t) also entails an increase in the storage capacity and consequently in the overall dimensions and costs of the components of memory unit 10. The choice of this storage capacity and therefore the measuring accuracy is determined by the road section to which the apparatus is to be applied.

As the pulse train on lead 1*b* representing the length Li of a given vehicle passes through the cascaded storage circuits 5, 6 and 7 with delays dependent on the instantaneous operating frequencies of clocks 25, 26 and 27, proper correlation of these operating frequencies with the mean speed values Vem, VM and Vdm will indeed let the contents of memory unit 10 reflect at any time the distribution of vehicles 2 on road section 11.

It is clear from the preceding description that the monitoring circuitry 60 of FIG. 1 is limited to the surveillance of a single lane. Thus, the shift registers 5, 6, 7 can only represent the images of vehicles traveling one behind the other. The occupancy-density signal DE(t) from circuit 12 is transmitted in the form of binary words to the circuit 20 calculating the encumbrance value P(t). The computer stage 20 thus supplies a value P(t), equal to the occupancy density DE(t) divided by the average speed VM of the vehicles on road section 11, which recurs at the cadence of the binary pulses emitted on lead 1*b* by the local measuring circuit 1. This encumbrance value P(t) is multiplied by a constant $\alpha$, contained in a memory 61, designed to provide more easily manipulatable values. A preferred value for this multiplication factor is $\alpha=10$. The encumbrance signal P(t) controls a traffic light 21 at a crossroads approached by road section 11. This control could be such, for example, that the changeover time of traffic light 21 varies progressively as a function of the values of the encumbrance signal P(t) indicative of the degree of loading of that road section.

Figure 2:
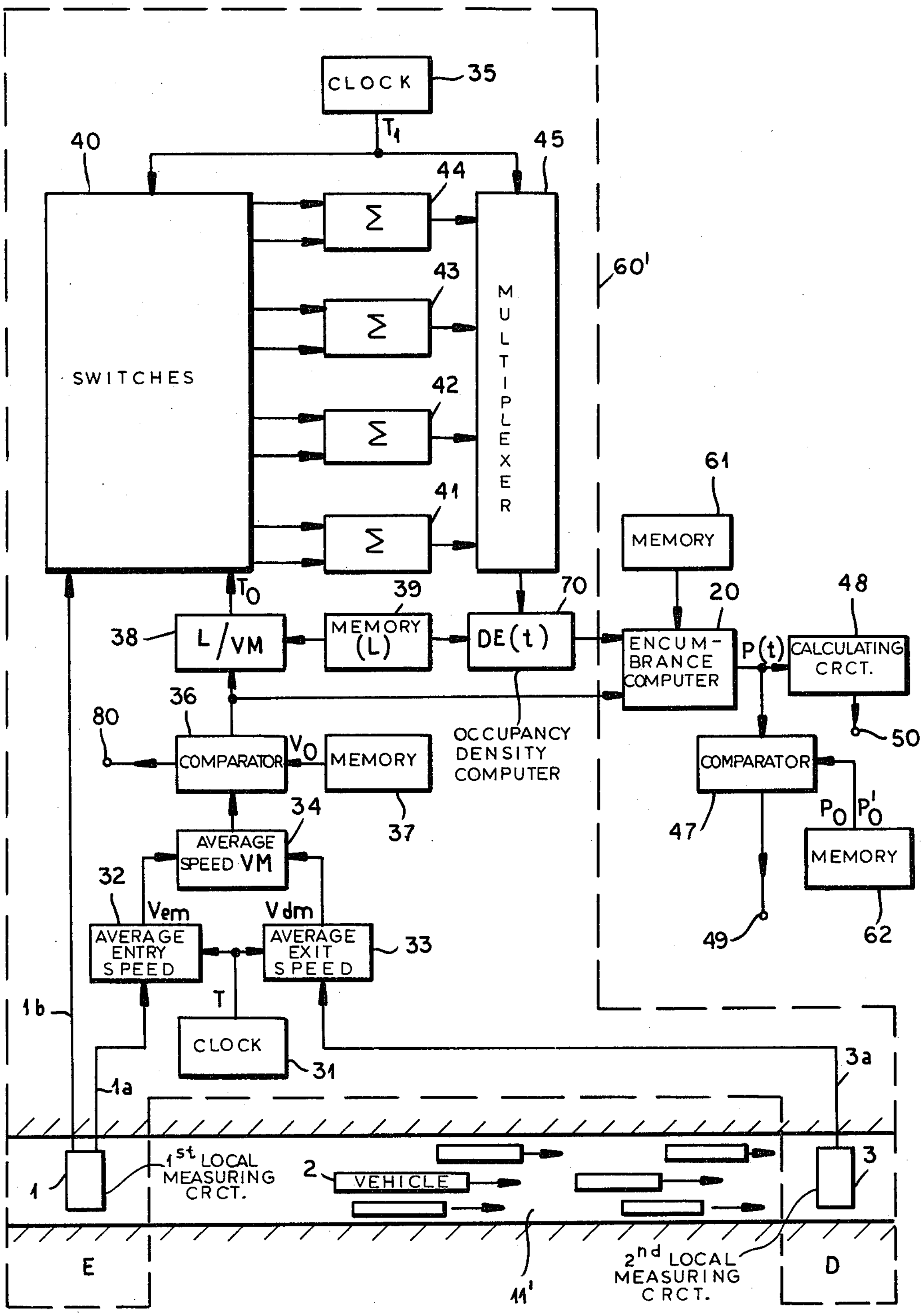
FIG. 2 shows a more elaborate embodiment.

According to the preferred mode of operation illustrated in FIG. 1, however, traffic light 21 is indirectly controlled from computer stage 20 by way of comparator 47 which continuously compares the encumbrance values P(t) from calculating circuit 20 with predetermined constant thresholds $P_0$, $P'_0$ contained in a memory 62 illustrated in FIG. 2. The comparator 47 then supplies a control signal to the load represented by traffic light 21 if P(t) is equal to or greater than threshold $P_0$ or is equal to or less than threshold $P'_0$, i.e. if the output signal of stage 20 deviates from a predetermined operating range. This latter control mode for the signaling system represented by traffic light 21 is simpler and can be more easily adapted to existing installations.

FIG. 2 shows a second embodiment of the apparatus according to my invention which is more particularly usable on a road section 11' of length L having several lanes.

This apparatus comprises a circuit arrangement 60', including the aforedescribed measuring circuits 1 and 3 at opposite ends E, D of road section 11' which determine the length and the entrance and exit speeds of vehicles 2 to enable a determination of the magnitudes of the occupancy density DE(t) and of the average overall speed VM. This circuit arrangement also includes the computer stage 20, calculating the encumbrance P(t), shown connected to memory 61 for supplying an amplified encumbrance signal $$\alpha\cdot P(t)=\alpha\cdot DE(t)/VM=\alpha\cdot\Sigma Li/L\cdot VM \quad (2)$$

This signal is transmitted to a comparator 47, identical with that of FIG. 1, and in parallel therewith to a calculating circuit 48 which supplies at a load terminal 50 an output signal corresponding to a function F(t) more fully described hereinafter. The aforementioned memory 62, in which are stored the predetermined thersholds $P_0$ and $P'_0$, is connected to one of the inputs of comparator 47.

Monitoring circuitry 60' comprises arithmetic means including two circuits 32 and 33 with inputs connected to leads 1*a* and 3*a* for determining the average speed at which the vehicles enter and leave the road section 11', these circuits being controlled by a clock 31 determining the time T during which the average speeds are calculated. The outputs of averaging circuits 32 and 33 are connected to a circuit 34 which calculates the average overall speed VM defined by the half-sum of the mean entry and exit speeds Vem and Vdm as described with reference to circuit 9 of FIG. 1. The output of circuit 34 is connected to a comparator 36 which is also connected to a memory 37 in order to compare the value of average speed VM with a predetermined threshold $V_0$ stored therein.

The output of comparator 36 is connected on the one hand to the encumbrance-calculating circuit 20 and on the other to a circuit 38 dividing the length L of road section 11', contained in a memory 39, by the average overall speed VM. The resulting quotient $T_0$ is fed to processing means including a controlled group of switches 40. The latter also receive from lead 1*b* of measuring circuit 1 the signals corresponding to the length Li of the vehicles 2 entering road section 11'. This group of switches 40 are connected to a multiplexer 45 via a set of identical adders 41–44. A clock circuit 35 is connected on the one hand to the control inputs of switches 40 and on the other hand to the control input of multiplexer 45. The output of multiplexer 45 is connected to a circuit 70 for calculating the occupancy density of road section 11', the computer stage 70 being also connected to memory 39 containing the value L of the length of the road section 11'. The output of circuit 70 is connected to the circuit 20 for calculating the encumbrance P(t).

A first test is performed on the output signal of circuit 34 by the comparator 36 designed to set off an alarm if the average speed VM is below the predetermined threshold $V_0$, thereby indicating a congestion. This alarm signal is available at a terminal 80. The quotient calculated by circuit 38 corresponds to the mean transit time $T_0$ needed by a vehicle 2 to trasverse the road section 11'. Each adder 41–44 receives the vehicular-length signals coming from measuring circuit 1 during such transit time $T_0$. The transit times $T_0$ during which the adders sum the lengths Li of the vehicles entering road section 11' are relatively staggered by equal delays $T_1$. The period $T_0$ during which one of these adders sums up the vehicular-length signals Li is accordingly offset by the delay $T_1$ from the period during which the following adder performs a similar summation.

Thus, after a delay $T_1$ from the instant at which the final adder 44 starts the summation of the vehicular-length signal Li, the first adder 41 recommences the summation of these signals.

Adders 41–44, accordingly, operate in cyclic succession during time intervals of constant duration staggered relatively to one another by the invariable delay $T_1$, dependent on the number N of those adders. This number N (here equal to four) consequently determines the repetition frequency of the information concerning the measurement of the occupancy density DE(t) available at the output of multiplexer 45. Thus, multiplexer 45 supplies at the cadence of signals from clock circuit 35 the results of different summations, performed during respective time intervals, of the lengths of vehicles entering road section 11'. The value of the occupancy density DE(t) is determined by circuit 70 feeding that value to computer stage 20 for the calculation of the encumbrance P(t) which is performed in the same way as in the embodiment of FIG. 1. The use of that parameter in the control of a signaling system for traffic regulation can be implemented either directly by comparator 47, via an output terminal 49 thereof, or by means of calculating circuit 48 transforming the time-varying encumbrance P(t) into a function F(t) selected to vary almost linearly with the traffic conditions on road section 11'.

Experiments have shown that it is advantageous to select a logarithmic function although a function $F(t)=\alpha\sqrt{P(t)}$ can also be used. I therefore prefer to design calculating circuit 48 in such a way that the signals available at its output terminal 50 correspond to a function $F(t)=\beta\cdot\log[1+P(t)]$ where $\beta$ is another predetermined constant. The signals from circuit 48 can then control the associated traffic-regulating system either directly or via a nonillustrated comparator similar to component 47.

It will be noted that in the monitoring circuitry 60' of FIG. 2 the division by the length L of road section 11', according to equation (2), is carried out by computer stage 70 rather than in stage 20 as in FIG. 1.

In the embodiment of FIG. 1 the occupancy-determination circuit 12, especially when it incorporates a microprocessor-type calculator with associated peripheral units, can directly supply a control signal to the traffic-regulating system (e.g. to traffic light 21) in case the length of an entering vehicle, represented by a series of unity pulses on lead 1*b*, equals or exceeds a predetermined value permanently stored in a memory incorporated in the occupancy-determination circuit 12. This can be of particular interest in the case of a road section carrying numerous heavy vehicles such as buses or trucks. Such a signaling mode would supplement the control of the traffic-regulating system by the evaluation of the encumbrance function as described above.

What is claimed is:

1. An apparatus for monitoring traffic on a road section of predetermined length L, comprising:

speed-sensing means disposed at said road section;

arithmetic means connected to said speed-sensing means for determining a mean overall speed VM of vehicles passing thereover;

pulse-generating means disposed at an entrance end of said road section for emitting trains of measuring pulses representing by their number the lengths Li of vehicles found entering said road section;

processing means connected to said arithmetic means and to said pulse-generating means for obtaining from said pulse trains and from said mean speed VM a count of said measuring pulses representing the combined length $\Sigma Li$ of vehicles simultaneously present on said road section and for deriving from said count an occupancy density $DE(t)=\Sigma Li/L$; and computer means connected to said processing means and to said arithmetic means for generating an output signal proportional to an encumbrance P(t)=DE(t)/VM indicative of the degree of loading of said road section by vehicular traffic.

2. An apparatus as defined in claim 1 wherein said speed-sensing means comprises first and second measuring circuits respectively disposed at the entrance end and at an exit end of said road section.

3. An apparatus as defined in claim 2 wherein said arithmetic means comprises a first and a second averaging circuit, receiving respective speed signals from said first and second measuring circuits, and a third averaging circuit with inputs connected to said first and second averaging circuits.

4. An apparatus as defined in claim 3 wherein said processing means comprises memory means including a shift register connected to the pulse generating means, said shift register being stepped by clock pulses at a frequency proportional to said mean speed VM, under the control of said third averaging circuit, for arranging said measuring pulses in a pattern reflecting the distribution of vehicles on said road section, said processing means further comprising pulse-counting means connected to said memory means for producing a signal representing said occupancy density DE(t) fed to said computer means.

5. An apparatus as defined in claim 4 wherein said shift register is part of a middle storage circuit connected in cascade between two other storage circuits with shift registers respectively stepped by clock pulses at frequencies proportional to a mean entrance speed and a mean departure speed under the control of said first and second averaging circuits, said shift registers having outputs connected in parallel to said pulse-counting means.

6. An apparatus as defined in claim 3 wherein a divider is connected to said third averaging circuit for establishing a transit time $T_0$=L/VM, said apparatus further comprising a plurality of adders and switching means for switching inputs of said adders in cyclic succession to said pulse-generating means for summing said measuring pulses during relatively staggered periods corresponding to said transit time $T_0$, and multiplexer means sequentially connecting outputs of said adders to a stage determining therefrom said occupancy density DE(t).

7. An apparatus as defined in claim 1, 2, 3, 4, 5 or 6, further comprising calculating means connected to said computer means for deriving from said output signal a control signal modifying the operation of traffic-regulating means at a location approached by said vehicles.

8. An apparatus as defined in claim 7 wherein said calculating means comprises a function generator emitting a control signal proportional to a variable F(t) logarithmically related to said encumbrance P(t).

9. An apparatus as defined in claim 7 wherein said calculating means comprises a function generator emitting a control signal proportional to the square root of said encumbrance P(t).

10. An apparatus as defined in claim 7 wherein said calculating means comprises a comparator emitting a control signal in response to a deviation of said output signal from a predetermined operating range.

* * * * *